United States Patent
Iyer

(10) Patent No.: US 10,467,205 B2
(45) Date of Patent: Nov. 5, 2019

(54) ONLINE FILE SYSTEM CHECK USING FILE SYSTEM CLONE

(71) Applicant: International Business Machines Corporation, Armonk, NY (US)

(72) Inventor: Karthik Iyer, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 15/075,289

(22) Filed: Mar. 21, 2016

(65) Prior Publication Data

US 2017/0270144 A1    Sep. 21, 2017

(51) Int. Cl.
*G06F 16/215* (2019.01)
*G06F 16/16* (2019.01)
*G06F 16/27* (2019.01)
*G06F 16/182* (2019.01)

(52) U.S. Cl.
CPC .......... *G06F 16/215* (2019.01); *G06F 16/162* (2019.01); *G06F 16/184* (2019.01); *G06F 16/275* (2019.01)

(58) Field of Classification Search
USPC ........................................................ 707/616
See application file for complete search history.

(56) References Cited

U.S. PATENT DOCUMENTS

| | | | |
|---|---|---|---|
| 7,818,302 B2 | 10/2010 | Godbole | |
| 8,301,602 B1 | 10/2012 | Jiang et al. | |
| 8,607,099 B2 | 12/2013 | Havewala et al. | |
| 9,235,481 B1 * | 1/2016 | Natanzon | G06F 11/14 |
| 2005/0114297 A1 | 5/2005 | Edwards | |
| 2008/0222152 A1 * | 9/2008 | Godbole | G06F 17/30067 |
| 2012/0016840 A1 * | 1/2012 | Lin | G06F 11/2097 707/626 |
| 2013/0117514 A1 | 5/2013 | Gunda et al. | |
| 2015/0067442 A1 * | 3/2015 | Shiozawa | G06F 11/1435 714/764 |
| 2015/0186217 A1 * | 7/2015 | Eslami Sarab | G06F 11/14 707/649 |

FOREIGN PATENT DOCUMENTS

WO    2010050944 A1    5/2010
WO    2015116125 A1    8/2015

* cited by examiner

*Primary Examiner* — Muluemebet Gurmu
(74) *Attorney, Agent, or Firm* — Stosch Sabo

(57) ABSTRACT

A file system check (fsck) utility configured to create a file system clone of an active file system. Respective user operations associated with the active file system are directed to the file system clone while the active file system undergoes fsck operations. After completing fsck operations and resolving file system corruptions in the active file system, the file system clone and the active file system are merged. After merging the file system clone and the active file system, respective user operations associated with the active file system are directed to the active file system and the file system clone is discarded.

16 Claims, 9 Drawing Sheets

ONLINE FILE SYSTEM CHECK USING FILE SYSTEM CLONE

BACKGROUND

The present disclosure relates to file systems, and more specifically, to maintaining online performance via a file system clone while checking a file system for corrupt data.

File systems can facilitate storing and retrieving data organized in a hierarchical structure of files and directories. Data managed by a file system can be held in blocks on persistent storage devices such as, for example, disks. Metadata can be used by a file system to track information such as, but not limited to, the location of allocated blocks, the amount and location of free space, mapping of file names to files, and other purposes.

File system corruptions can degrade the performance of a file system. In order to restore integrity of the file system, a file system consistency check (fsck) utility can be used. Fsck operations can inspect file system data/metadata and repair corrupted file system data/metadata.

SUMMARY

Aspects of the present disclosure are directed toward a method comprising creating a file system clone replicating an active file system at a first time, creating a file system consistency check (fsck) block allocation map, creating a fsck cross-linked block allocation map, and creating a fsck inode allocation map. The method can further comprise checking the active file system for file system corruptions, where user operations associated with the active file system are executed on the file system clone concurrent with checking the active file system. The method can further comprise merging the file system clone with the active file system in response to resolving one or more file system corruptions. While merging the file system clone with the active file system, a respective user operation associated with a respective block of the active file system is executed on the active file system after merging a respective corresponding block of the file system clone with the respective block of the active file system.

Aspects of the present disclosure are further directed toward a system comprising an interface configured to receive user input regarding user operations associated with an active file system and a processor communicatively coupled to the interface and configured to execute a file system consistency check (fsck) utility. The fsck utility can be communicatively coupled to the active file system and a file system flag. The file system flag is configured to manage user operations associated with the active file system. The processor can be configured to generate a file system clone replicating the active file system at a first time, a fsck block allocation map, a fsck cross-linked block allocation map, and a fsck inode allocation map. The processor can be further configured to set the file system flag to fsck-scan-mode responsive to generating the file system clone. Fsck-scan-mode can direct respective user operations associated with the active file system to be executed on the file system clone. The processor can be further configured to resolve one or more file system corruptions in the active file system while the file system flag is set to fsck-scan-mode. The processor can be further configured to set the file system flag to clone-merge-mode responsive to resolving one or more file system corruptions in the active file system. Clone-merge-mode can direct respective user operations associated with a respective block of the active file system to be executed on the active file system after merging a respective block of the file system clone with the respective block of the active file system. The processor can be further configured to merge respective blocks of the file system clone with respective blocks of the active file system while the file system flag is set to clone-merge-mode.

Aspects of the present disclosure are further directed toward a computer program product comprising a computer readable storage medium having program instructions embodied therewith. The computer readable storage medium is not a transitory signal per se, and the program instructions can be executable by a processor to cause the processor to perform a method comprising creating a file system clone replicating an active file system at a first time, a file system consistency check (fsck) block allocation map, a fsck cross-linked block allocation map, and a fsck inode allocation map. The program instructions can cause the processor to perform a method further comprising checking the active file system for file system corruptions, where user operations associated with the active file system are executed on the file system clone concurrent with checking the active file system. The program instructions can cause the processor to perform a method further comprising merging, in response to resolving one or more file system corruptions, the file system clone with the active file system, where a respective user operation associated with a respective block of the active file system is executed on the active file system after merging a respective corresponding block of the file system clone with the respective block of the active file system.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
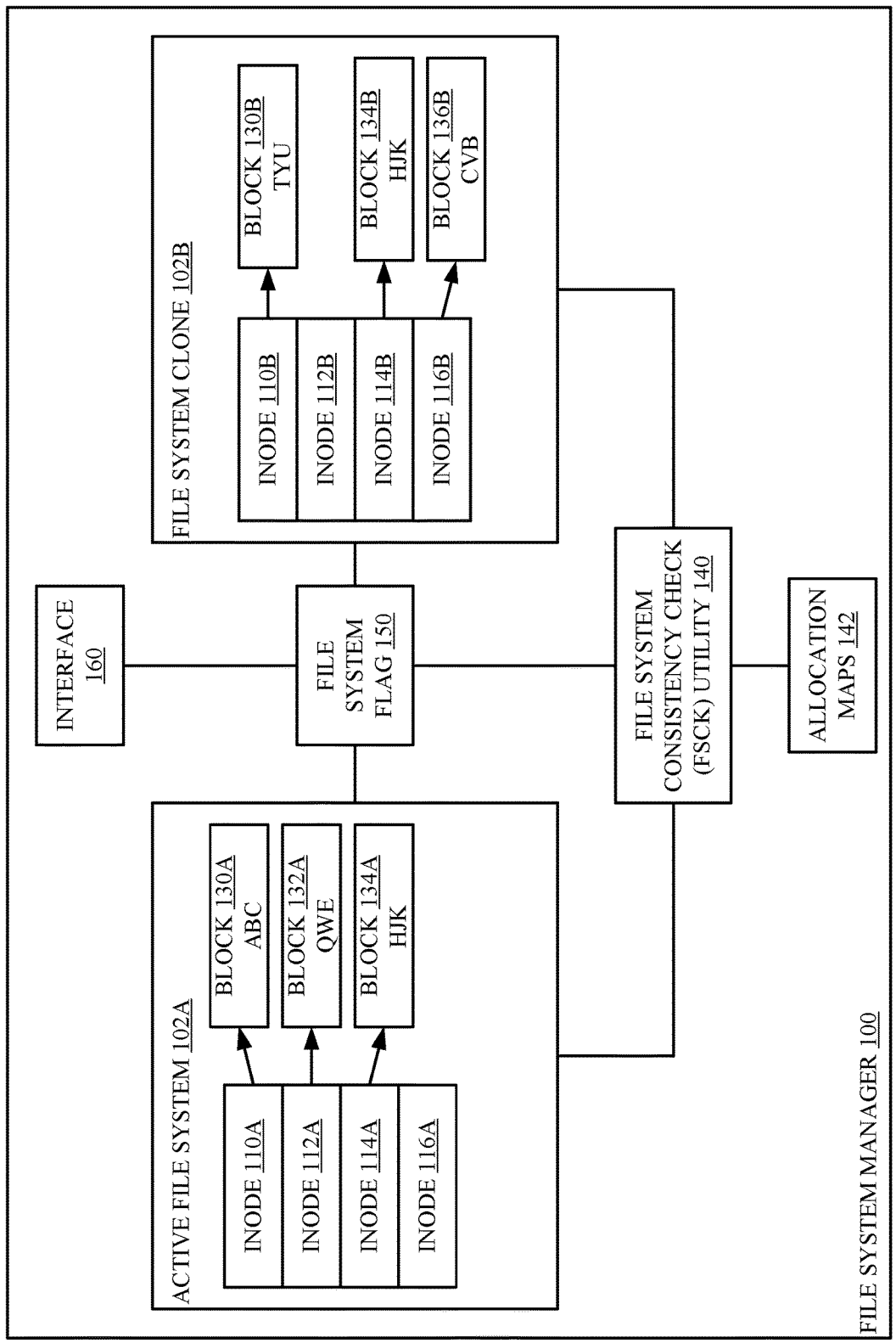
FIG. 1 illustrates a block diagram of an example system according to some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to file systems. More particular aspects relate to using a file system clone to maintain file system functionality while identifying and repairing file system corruptions. Although not limited to such applications, an understanding of some embodiments of the present disclosure may be improved given the context of file system consistency check (fsck) operations on a file system.

A file system can store data organized in a hierarchical structure of files and directories. File systems can include metadata regarding inodes, indirect blocks, allocation maps, and directories. Inodes can comprise metadata about a single file such as, but not limited to, owner, access permissions, file size, number of links, access timestamps, modification timestamps, and so on. Inodes can further contain disk pointers providing direction to data blocks storing file data. In some instances, inode disk pointers can point to one or more indirect blocks. Indirect blocks can contain disk pointers to data blocks storing file data. Alternatively, indirect blocks can contain disk pointers to additional indirect blocks. Each inode can be associated with a unique inode number. A directory can be a file used in the file system to store the mapping between file names and inode numbers. Groups of inodes can be stored in an inode file.

An allocation map can be a bitmap where each bit indicates the availability of an inode or disk block in the file system. In some embodiments, a set bit can indicate an allocated block while an empty or reset bit can indicate an unallocated block. There can be one allocation map to track inodes and another allocation map to track disk blocks.

File system data and/or metadata can become corrupt due to, for example, allocation map inconsistencies, cross-linked blocks, inode corruption, and/or directory corruption. Allocation map inconsistency can occur when the state of the block allocation map does not match the state of the inode. A cross-linked block can be a disk block that is referenced more than once within the file system. That is to say, a cross-linked block can have two disk pointers directed to the same disk block. Inode corruption of file attributes like file size or inaccurate disk pointers can make file data inaccessible. Directory corruption can break the directory tree and make files and sub-directories inaccessible.

A file system can experience degraded performance when it contains corruptions. Fsck operations can be used to inspect file system metadata/data and repair corruptions. Fsck operations can inspect the file system metadata by validating inodes, checking allocation maps, validating the directory tree, and so on. Fsck operations can benefit from a consistent view of the file system. A consistent view of the file system can be achieved by preventing modifications to the file system data and metadata while fsck operations are running. Since fsck scan time is proportional to the size of the file system, fsck scanning can cause large file systems to be offline for an extended period of time in order to ensure no modifications are made to the file system.

Advantageously, aspects of the present disclosure can execute fsck scans and repairs on an active file system while a file system clone remains online and operable during fsck operations. Furthermore, aspects of the present disclosure can advantageously detect numerous corruptions such as, but not limited to, cross-linked block corruptions, inode corruptions, directory corruptions, and/or allocation map corruptions. Further still, aspects of the present disclosure can advantageously use a clone-merge process that can ensure various modifications made to a file system clone and repairs made to an active file system are merged in a single process.

It is to be understood that the aforementioned advantages are example advantages and should not be construed as limiting. Embodiments of the present disclosure can contain all, some, or none of the aforementioned advantages while remaining within the spirit and scope of the present disclosure.

Referring now to FIG. 1, shown is a block diagram of an example system in accordance with some embodiments of the present disclosure. As shown, FIG. 1 illustrates an active file system 102A and a file system clone 102B stored in a file system manager 100. The active file system 102A can contain inodes 110A, 112A, 114A and 116A. These inodes can correspond to cloned inodes of file system clone 102B, namely inodes 110B, 112B, 114B, and 116B.

In accordance with embodiments of the present disclosure, active file system 102A can be placed in read only mode during fsck scan and repair operations. Meanwhile, users can interact with file system clone 102B while the active file system 102A undergoes fsck scan and repair operations. Following fsck operations on the active file system 102A, the file system clone 102B can be merged into the active file system 102A such that user operations conducted on the file system clone 102B during fsck operations on the active file system 102A are integrated into the active file system 102A.

In the active file system 102A, for example, inode 110A can point to block 130A ABC, inode 112A can point to block 132A QWE, and inode 114A can point to block 134A HJK. During the fsck operations occurring on active file system 102A, numerous modifications can be made to file system clone 102B. For example, block 130B can be modified from ABC to TYU, block 132A QWE can be deleted, block 134B HJK can remain unchanged, and block 136B CVB can be added. Following fsck operations on the active file system 102A, these changes to the file system clone 102B can be merged into the active file system 102A.

In some embodiments, the file system manager 100 can further include a file system consistency check (fsck) utility 140. The fsck utility 140 can be communicatively coupled to the active file system 102A, the file system clone 102B, a file system flag 150, and allocation maps 142. The fsck utility 140 can include processor-executable instructions for conducting scan and repair operations on the active file system 102A, for creating the file system clone 102B, for merging the file system clone 102B and the active file system 102A, and for generating allocation maps 142 such as, but not limited do, inode allocation maps, block allocation maps, and cross-linked block allocation maps.

In some embodiments, the file system manager 100 can further include a file system flag 150. The file system flag 150 can be communicatively coupled to the active file system 102A, the file system clone 102B, the fsck utility 140, and an interface 160. The file system flag 150 can moderate user operations received via the interface 160 to be executed by the active file system 102A or the file system clone 102B according to instructions received from the fsck utility 140.

The file system manager 100 will be described in further detail hereinafter with respect to FIG. 2. File system check operations executed by fsck utility 140 will be described in further detail hereinafter with respect to FIGS. 3 and 5-6. The creation of file system clone 102B will be described in further detail hereinafter with respect to FIG. 4. The merging of the active file system 102A with the file system clone 102B following scan and repair operations by fsck utility 140 will be described in further detail hereinafter with respect to FIG. 7. The execution of operations on the active file system 102A or the file system clone 102B as indicated by the file system flag 150 will be described in further detail hereinafter with respect FIGS. 8-9.

Figure 2:
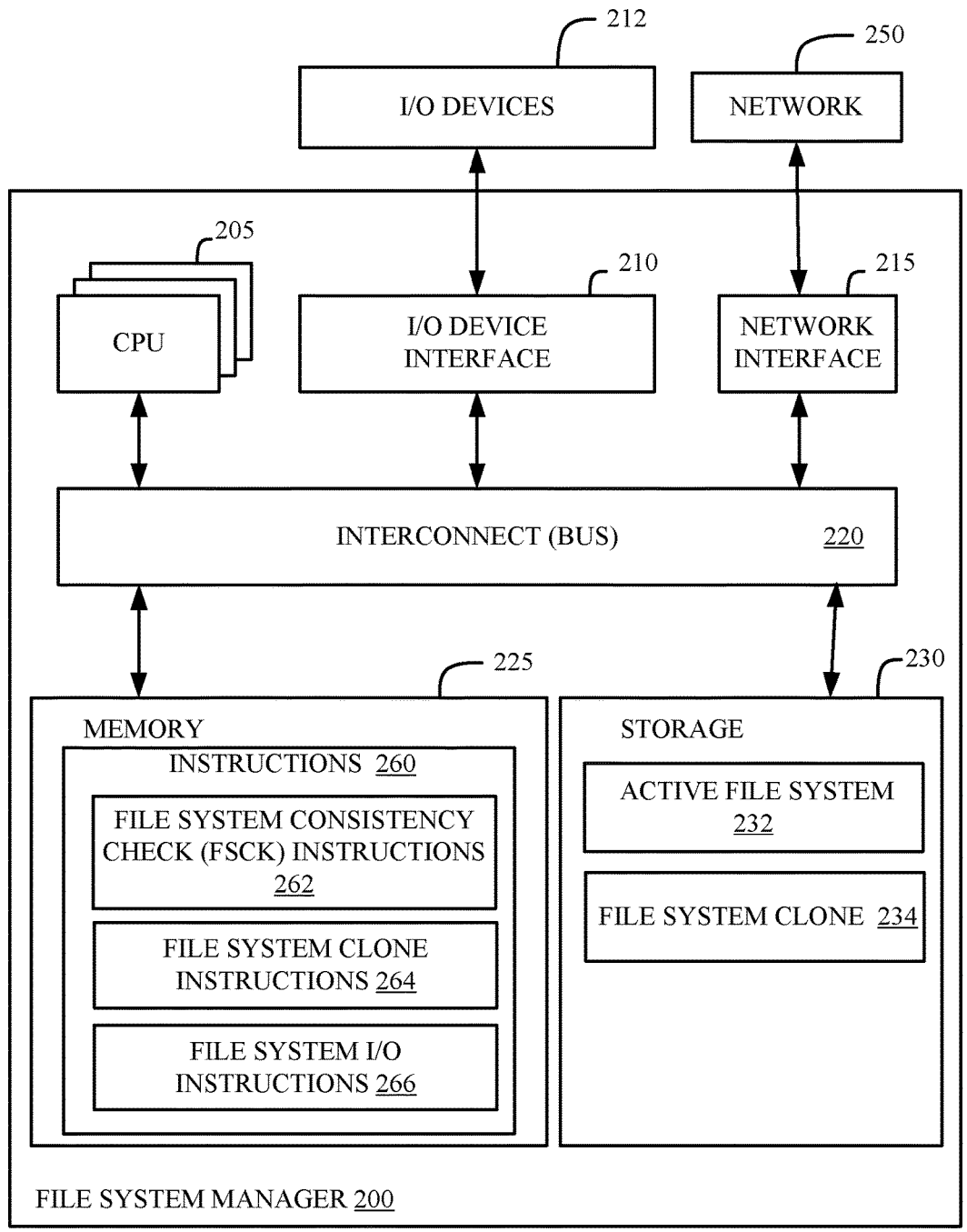
FIG. 2 illustrates a block diagram of a file system manager according to some embodiments of the present disclosure.

Referring now to FIG. 2, shown is a block diagram of a file system manager according to some embodiments of the present disclosure. In some embodiments, the file system manager 200 can be consistent with file system manager 100 of FIG. 1. The file system manager 200 can include a memory 225, storage 230, an interconnect (e.g., BUS) 220, one or more processors (e.g., CPUs) 205, an I/O device interface 210, I/O devices 212, and a network interface 215.

Each CPU 205 retrieves and executes programming instructions stored in the memory 225 or storage 230. The interconnect 220 is used to move data, such as programming instructions, between the CPU 205, I/O device interface 210, storage 230, network interface 215, and memory 225. The interconnect 220 can be implemented using one or more busses. The CPUs 205 (also referred to as processors 205 herein) can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the file system manager 200 via the I/O devices 212 or a communication network 250 via the network interface 215.

In some embodiments, the memory 225 stores instructions 260 and the storage 230 stores an active file system 232 and a file system clone 234. However, in various embodiments, the instructions 260, the active file system 232, and the file system clone 234 are stored partially in memory 225 and partially in storage 230, or they are stored entirely in memory 225 or entirely in storage 230, or they are accessed over a network 250 via the network interface 215.

In some embodiments, the active file system 232 can comprise the original file system in read-only mode and undergoing fsck operations while the file system clone 234 can comprise a copy of active file system 232 that can remain online and operational while active file system 232 undergoes fsck operations. In some embodiments, active file system 232 can be consistent with active file system 102A of FIG. 1. Likewise, in some embodiments, file system clone 234 can be consistent with file system clone 102B of FIG. 1.

The instructions 260 can store processor executable instructions for various methods such as the methods shown and described with respect to FIG. 3-9. The instructions 260 can store file system consistency check (fsck) instructions 262, file system clone instructions 264, and file system I/O instructions 266. In some embodiments, instructions 260 are consistent with fsck utility 140 of FIG. 1.

In various embodiments, the I/O devices 212 can include an interface capable of presenting information and receiving input. The network 250 can comprise a network connecting a plurality of file systems and/or a plurality of file system managers. In some embodiments, I/O device interface 210 and/or network interface 215 are consistent with interface 160 of FIG. 1.

Figure 3:
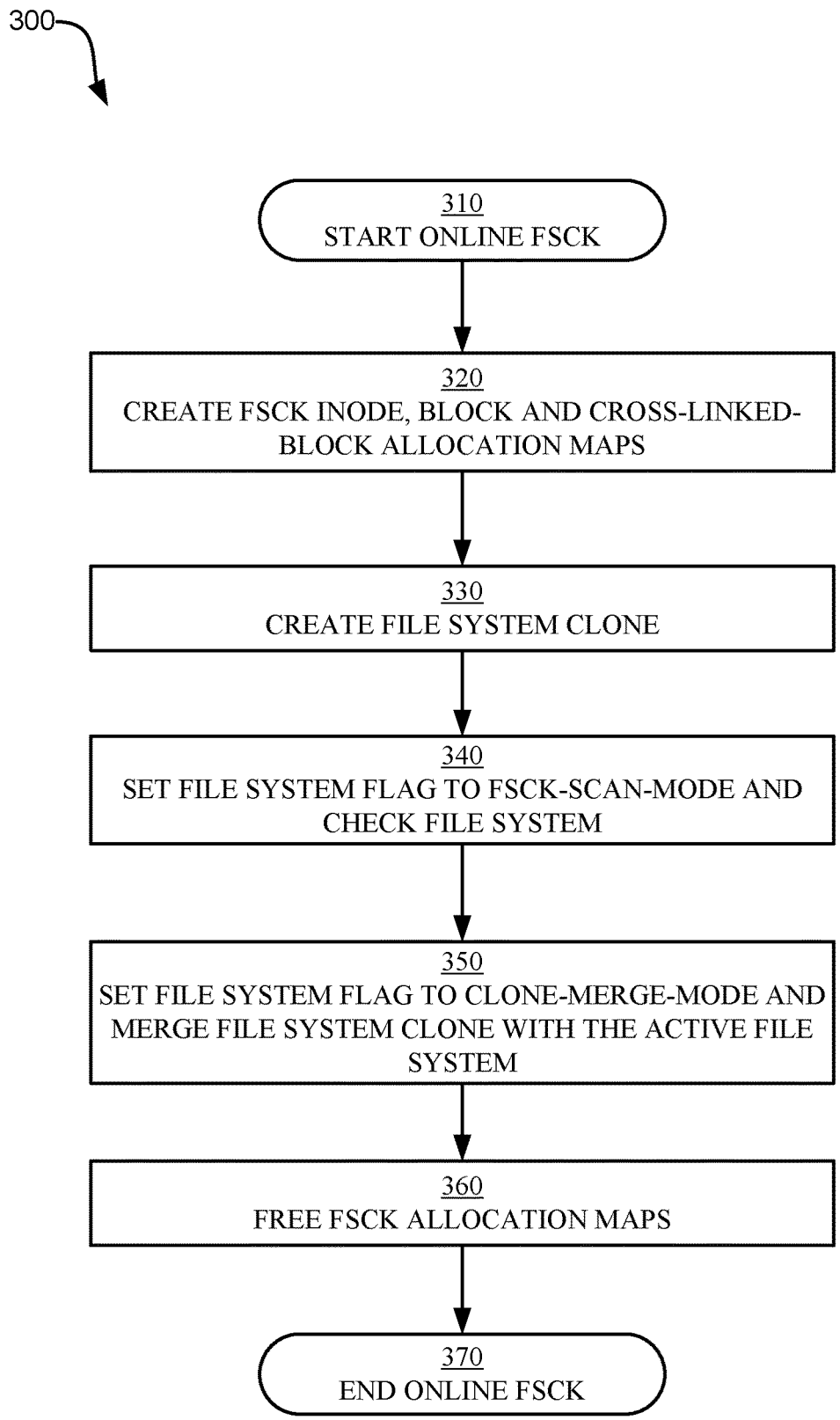
FIG. 3 illustrates a flowchart of a method for online file system consistency check (fsck) operations using a file system clone according to some embodiments of the present disclosure.

Referring now to FIG. 3, illustrated is a flowchart for online fsck operations using a file system clone. In some embodiments, the method 300 is executed by a processor (e.g., processor 205 of FIG. 2) executing a set of instructions (e.g., fsck instructions 262 of FIG. 2) configured to run fsck operations on an active file system (e.g., active file system 232 of FIG. 2) while keeping the file system online via a file system clone (e.g., file system clone 234 of FIG. 2).

The method 300 can start online fsck operations in operation 310. In operation 320, a fsck inode allocation map can be created, a fsck block allocation map can be created, and/or a fsck cross-linked block allocation map can be created. In some embodiments, the allocation maps are initially blank. While undergoing fsck operations, the allocation maps can be populated, by, for example, setting bits of respective allocation maps corresponding to respective blocks or respective inodes of the respective file systems.

In operation 330, a file system clone can be created. The file system clone can replicate an active file system at a given time. Operation 330 is described in further detail hereinafter with respect to FIG. 4. In operation 340, the file system can be checked using fsck operations. In some embodiments, operation 340 includes setting a file system flag (e.g., file system flag 150 of FIG. 1) to fsck-scan-mode prior to checking the file system. In some embodiments, setting the file system flag to fsck-scan-mode can transfer user operations to execute on the file system clone during fsck operations. Operation 340 is described in further detail hereinafter with respect to FIG. 5-6. In operation 350, the file system clone can be merged with the active file system. In some embodiments, operation 350 further comprises setting the file system flag to clone-merge-mode prior to merging the file system clone with the active file system. In some embodiments, setting the file system flag to clone-merge-mode can transfer user operations associated with a respective block of the active file system to occur on the active file system after merging the respective block of the active file system with a respective corresponding block of the file system clone. Operation 350 is described in further detail hereinafter with respect to FIG. 7. In operation 360, the fsck allocation maps can be removed following the completion of fsck operations. In operation 370, fsck operations can end.

Thus, FIG. 3 illustrates an example method for executing fsck scan and repair operations while maintaining an online file system clone. Aspects of FIG. 3 will be described in greater detail hereinafter with respect to FIG. 4-9.

Figure 4:
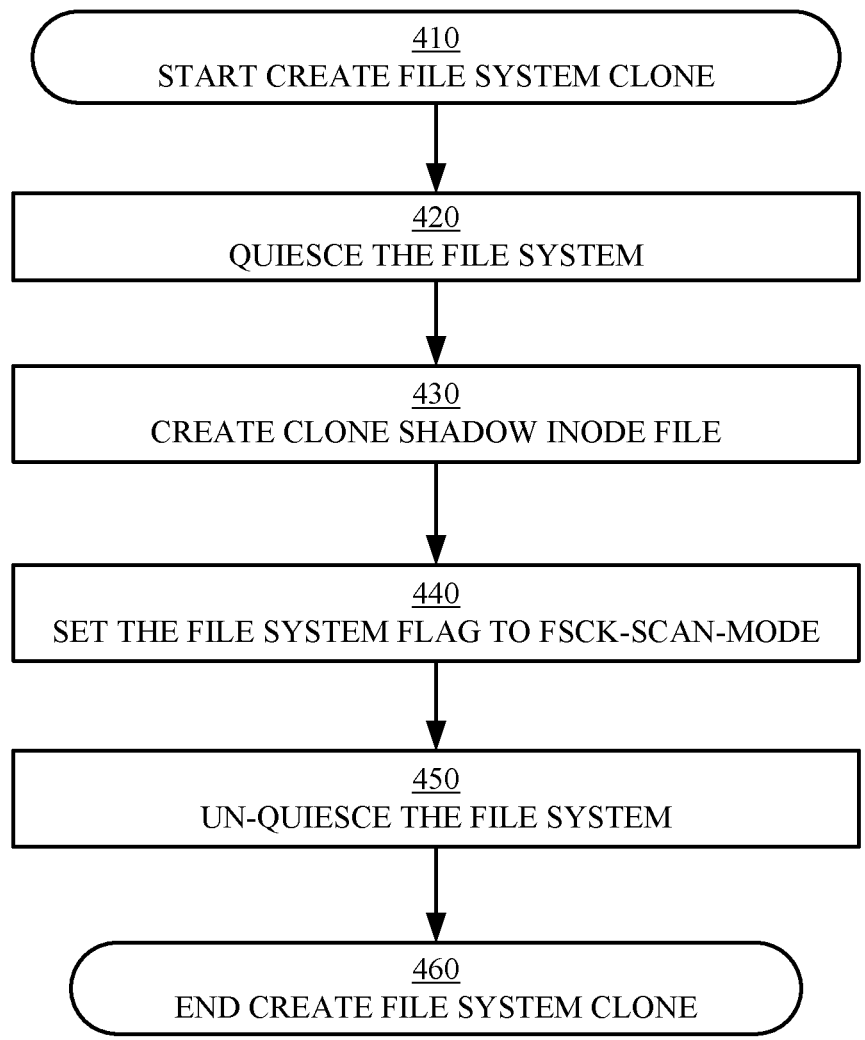
FIG. 4 illustrates a flowchart of an example method for creating a file system clone according to some embodiments of the present disclosure.

Referring now to FIG. 4, illustrated is an example flowchart for a method for creating a file system clone. The method 400 can be executed by one or more processors (e.g., processors 205 of FIG. 2) executing a set of instructions (e.g., file system clone instructions 264 of FIG. 2). In some embodiments, the method 400 is a submethod of operation 330 of FIG. 3. The method 400 can start at operation 410. In operation 420, a file system manager can quiesce the active file system. Quiescing the active file system can temporarily suspend updates to the active file system. In some embodiments, quiescing the active file system can ensure dirty blocks cached in memory are flushed to disk such that pending modifications to the active file system are concluded prior to suspending the active file system.

In operation 430, a clone shadow inode file can be created. In some embodiments, the clone shadow inode file can contain pointers to the inodes in the active file system. If a user modifies data and/or metadata, the modified blocks can be attached to the clone inode file instead of updating the active file system. In the event a user deletes a block, a null disk pointer can be used to denote the absence of the block in the clone inode file. The actual block can continue to be present in the active file system. Thus, the inode file of the active file system and its snapshots do not change during fsck operations. In some embodiments, the file system clone can store its own copy of the inode allocation map and can share a copy of the block allocation map with the active file system and its snapshots.

In operation 440, a file system flag (e.g., file system flag 150 of FIG. 1) can be set to fsck-scan-mode. In some embodiments, the file system flag set to fsck-scan-mode causes file system operations to execute using the file system clone instead of the active file system. In operation 450, the active file system can be un-quiesced. The un-quiesced active file system can then be checked using fsck operations. In operation 460, the method 400 can end.

Figure 5:
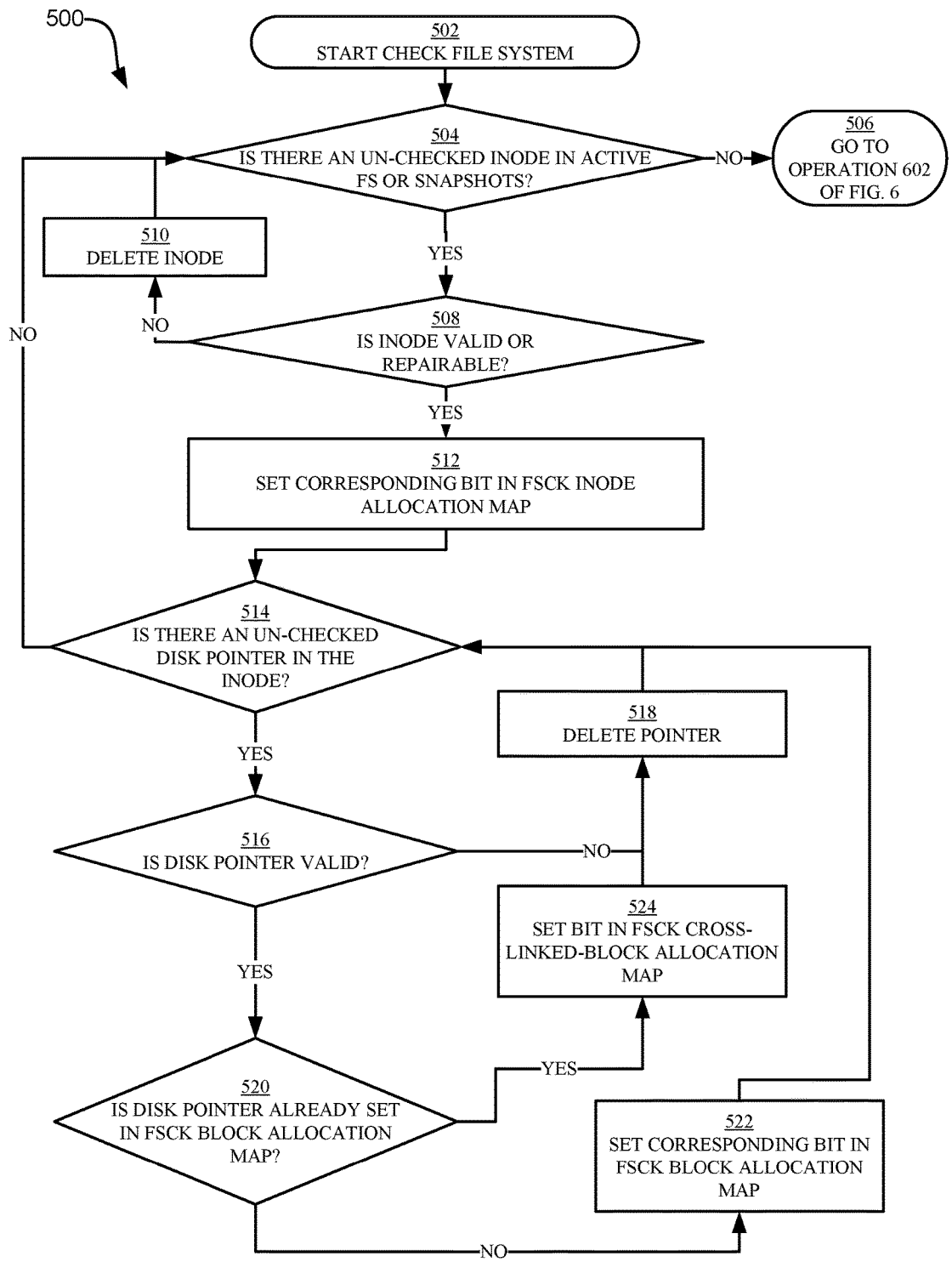
FIG. 5 illustrates a flowchart of an example method for checking an active file system using fsck operations according to some embodiments of the present disclosure.

Referring now to FIG. 5, shown is an example method for checking the active file system using fsck operations. The method 500 can be implemented by one or more processors (e.g., processors 205 of FIG. 2) executing a set of instructions (e.g., fsck instructions 262 of FIG. 2). In some embodiments, the method 500 can be multi-threaded and distributed across a plurality of nodes. The method 500 can start checking the active file system in operation 502. In operation 504, the method 500 can determine if there is a respective inode in the active file system or its snapshots which has not been evaluated by the method 500. If not, the method 500 can proceed to operation 506 described in further detail hereinafter with respect to the method 600 of FIG. 6. If there are one or more respective inodes in the active file system or one of its snapshots that has not been evaluated using the method 500, then the method 500 can select a respective un-checked inode and proceed to operation 508.

Operation 508 can determine if the respective inode is valid or repairable. If the inode is determined to not be valid and/or repairable, the inode can be deleted in operation 510 and the method 500 can return to operation 504 and determine if there are other un-checked inodes in the active file system or one of its snapshots. If the inode is determined to be valid and/or repairable in operation 508, the method 500 can proceed to operation 512. Operation 508 can comprise numerous operations to determine if a respective inode is or is not valid or repairable. For example, allocated inodes can be checked for directory entries and the correctness of an existing directory entry, unallocated inodes can be checked for invalid directory entries, inodes can be evaluated for missing or corrupt metadata, and so on.

In operation 512, a bit in a fsck inode allocation map can be set corresponding to the valid inode and the method 500 can proceed to operation 514. Operation 514 can determine if there are one or more disk pointers of the respective inode which have not been evaluated by the method 500. If there are no un-checked disk pointers in the respective inode, the method 500 can return to operation 504 and continue searching for un-checked inodes in the active file system or one of its snapshots. If operation 514 determines that there are one or more un-checked disk pointers in the respective inode, the method 500 can proceed to operation 516.

Operation 516 can determine if the selected disk pointer is valid. If the selected disk pointer is not valid, the method 500 can proceed to operation 518 and delete the selected disk pointer. The method 500 can then return to operation 514 to determine if there are other disk pointers of the respective inode which can be evaluated. If operation 516 determines that the selected disk pointer is valid, the method 500 can proceed to operation 520. Operation 516 can comprise numerous operations to determine if a selected disk pointer is valid. For example, operation 516 can determine if a selected disk pointer points to an existing or non-existent block.

Operation 520 can determine if the selected disk pointer points to a block that is already set in the fsck block allocation map. If the selected disk pointer points to a block that is already set in the fsck block allocation map, it can imply a cross-linked block, and the method 500 can proceed to operation 524. In operation 524, a bit corresponding to a respective block pointed to by the selected disk pointer can be set in the fsck cross-linked-block allocation map before proceeding to operation 518 where the selected disk pointer can be deleted and the method 500 can then return to operation 514 to check other disk pointers in the respective inode. If operation 520 determines that the selected disk pointer points to a block that is not already set in the fsck block allocation map, the method 500 can proceed to operation 522 and set a bit corresponding to a respective block pointed to by the selected disk pointer in the fsck block allocation map. Following operation 522, the method can return to operation 514 and check other disk pointers in the respective inode.

If there are no other disk pointers in the respective inode, the method 500 can return to operation 504 to determine if there are additional un-checked inodes in the active file system or one of its snapshots. If there are no more un-checked inodes in the active file system or one of its snapshots, the method 500 can proceed to operation 506. Operation 506 is described in further detail hereinafter with respect to FIG. 6.

Thus, FIG. 5 illustrates an example method for deleting invalid or unrepairable inodes, and, for each valid or repairable inode, identifying disk pointers in the respective inode. For respective disk pointers in respective valid inodes, the method 500 can delete invalid disk pointers, set bits in the fsck block allocation map corresponding to respective blocks pointed to by respective selected disk pointers, or set bits in the fsck cross-linked block allocation map corresponding to respective blocks pointed to by respective selected disk pointers where the respective corresponding blocks are already set in the fsck block allocation map.

Figure 6:
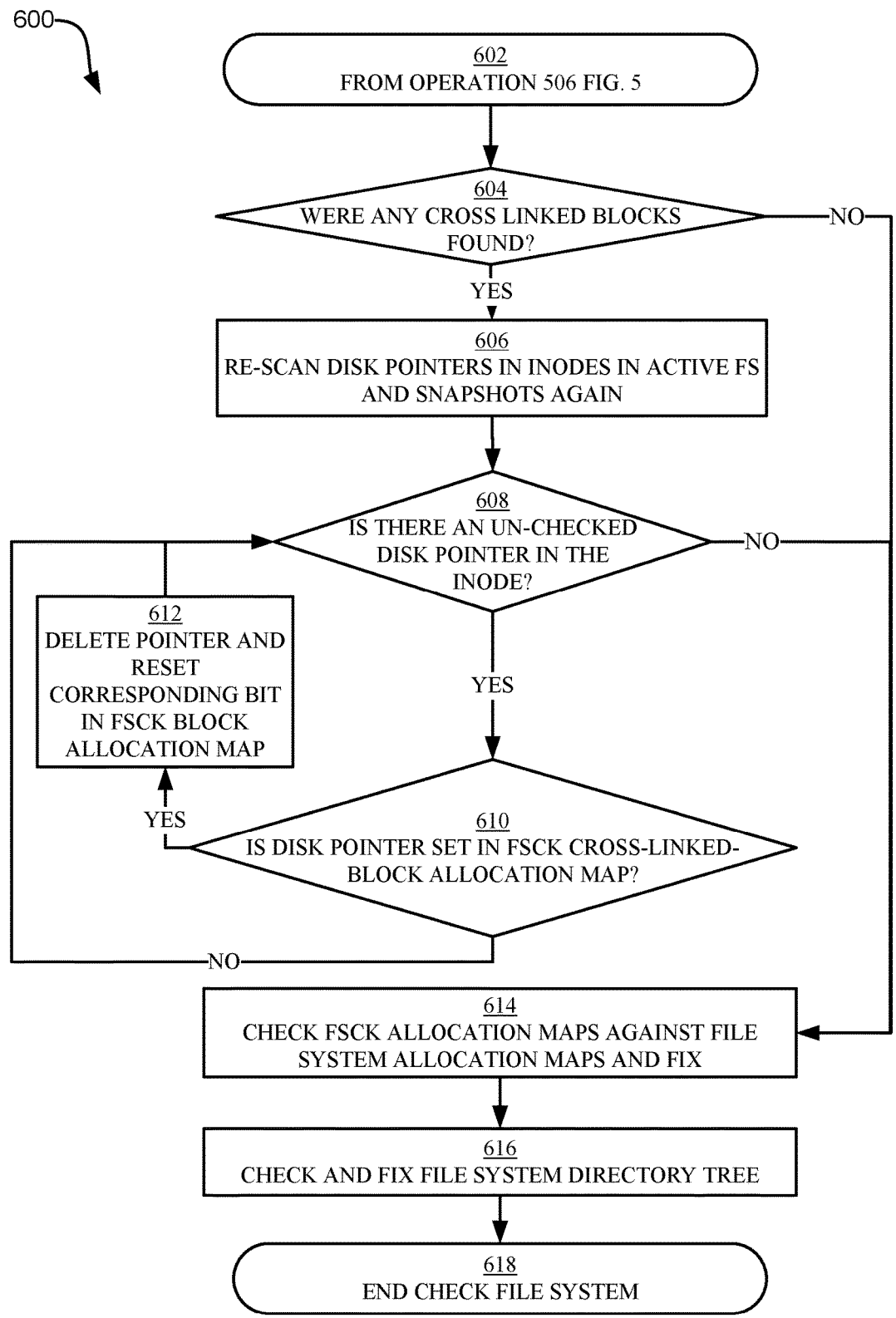
FIG. 6 illustrates a flowchart of an example method for repairing an active file system using fsck operations according to some embodiments of the present disclosure.

Referring now to FIG. 6, illustrated is an example flowchart of a method for identifying first references to cross-linked blocks in an active file system using fsck operations. The method 600 can be implemented by one or more processors (e.g., processors 205 of FIG. 2) executing a set of instructions (e.g., fsck instructions 262 of FIG. 2). In some embodiments, the method 600 can be multi-threaded and executed across a plurality of nodes. The method 600 can begin in operation 602 which stems from operation 506 of FIG. 5. In some embodiments, at operation 602, all inodes and their respective disk pointers have been checked using the method 500.

Operation 604 can determine if any cross-linked blocks were found. If no cross-linked blocks were found, then the method 600 can proceed to operation 614 and check the fsck allocation maps against the file system allocation maps and fix any corruptions. If one or more cross-linked blocks were found by the method 500, then operation 604 can proceed to operation 606.

Operation 606 can re-scan one or more disk pointers in one or more inodes in the active file system and its snapshots again. Operation 608 can determine if there is an un-checked disk pointer in a respective inode. If there is no un-checked disk pointer in the inode, the method 600 can proceed to operation 614 and compare the fsck allocation maps against the active file system allocation maps. If there are one or more un-checked disk pointers in the inode, the method 600 can proceed to operation 610.

Operation 610 can determine if the disk pointer points to a block having a corresponding bit set in the fsck cross-linked block allocation map. If the disk pointer does not point to a block in the fsck block allocation map having a corresponding bit set in the fsck cross-linked block allocation map, then the method 600 can return to operation 608 and determine if there is another un-checked disk pointer in the inode. If the disk pointer does point to a block in the fsck block allocation map having a corresponding bit set in the fsck cross-linked block allocation map, then the method 600 can proceed to operation 612.

Operation 612 can delete the pointer and reset the corresponding bit in the fsck block allocation map and/or the corresponding bit in the fsck cross-linked block allocation map. Operation 612 can therefore identify and delete first disk pointers to cross-linked blocks (whereas operations 520 and 524 of FIG. 5 can detect a second (or greater) disk pointer to a cross-linked block). The method 600 can then return to operation 608 to determine if there are additional other unchecked disk pointers for a respective inode.

In the event that no cross-linked blocks were found in operation 604, or in the event that there are no un-checked disk pointers remaining in the one or more respective inodes in operation 608, the method 600 can proceed to operation 614. In operation 614, the fsck allocation maps can be checked against the file system allocation maps (e.g., block allocation maps, cross-linked block allocation maps, and/or inode allocation maps). Corruptions can be identified by discrepancies between the respective maps, and the corruptions can be fixed by fsck operations. The method 600 can then proceed to operation 616. Operation 616 can check and fix the file system directory tree. Following operation 616, the method 600 can end at operation 618.

Thus, FIG. 6 illustrates a method for reviewing cross-linked blocks by finding first references to said cross-linked blocks identified in the method 500. The methods 500 and 600 taken together can check an active file system for corruptions while a file system clone remains online during the fsck operations.

Figure 7:
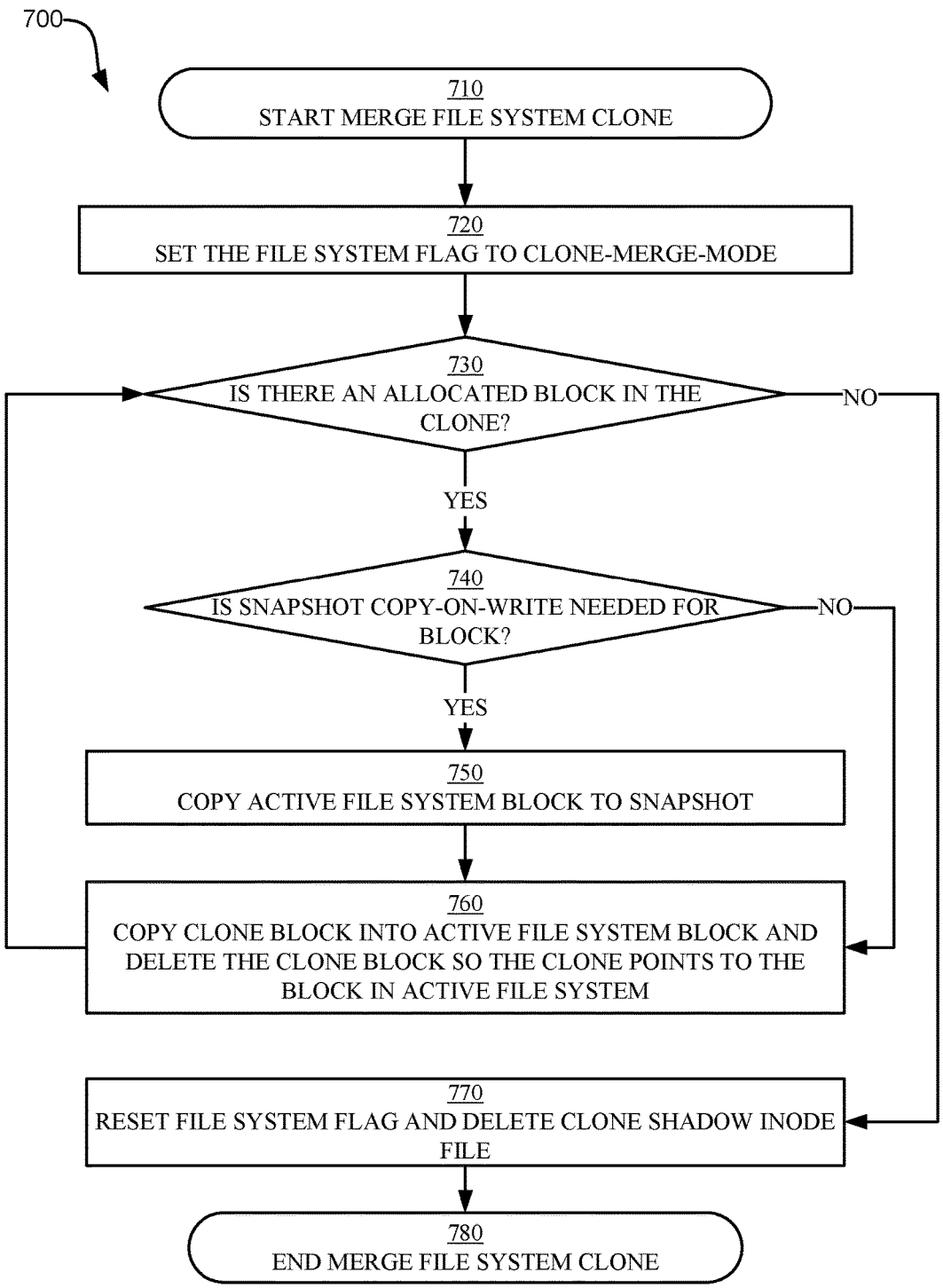
FIG. 7 illustrates a flowchart of an example method for merging a file system clone with an active file system according to some embodiments of the present disclosure.

Referring now to FIG. 7, illustrated is an example flowchart for a method for merging a file system clone with an active file system following completion of fsck scan and repair operations. In some embodiments, the method 700 can be implemented by one or more processors (e.g., processors 205 of FIG. 2) according to a set of instructions (e.g., file system clone instructions 264 of FIG. 2).

Operation 710 can initiate the method 700 comprising merging of the file system clone and the active file system. In operation 720, the file system flag (e.g., file system flag 150 of FIG. 1) can be set to clone-merge-mode. In some embodiments, after setting the file system flag to clone-merge-mode, each allocated block in the file system clone can be locked prior to performing the clone merge operation. Operation 730 can determine if there is an allocated block in the file system clone. If there is no allocated block in the file system clone, the method 700 can proceed to operation 770 and reset the file system flag to a normal mode (i.e., execute all operations on the active file system) and delete the clone shadow inode file. If operation 730 determines that there are one or more allocated blocks in the file system clone, the method 700 can proceed to operation 740.

Operation 740 can determine if there is a snapshot copy-on-write needed for the respective allocated block according to metadata of the allocated block. Copy-on-write can refer to copied blocks of data prior to modification of the copied blocks. If no snapshot copy-on-write is needed for the respective allocated block, then the method 700 can proceed to operation 760 where the clone block can be copied into the active file system block and the clone block can subsequently be deleted so that the file system clone now points to the block in the active file system. If operation 740 determines there is a snapshot copy-on-write needed for the respective allocated block, then the method 700 can proceed to operation 750. In operation 750, the active file system block can be copied to the snapshot. In operation 760, the clone block can be copied into the active file system block and the clone block can subsequently be deleted so that the clone now points to the block in the active file system.

Following operation 760, the method 700 can return to operation 730 to determine if there are other allocated blocks in the file system clone. If there are other allocated blocks in the file system clone, the method 700 can proceed again through operations 740-760 for respective allocated blocks in the file system clone. If there are no more allocated blocks in the file system clone, then the method 700 can proceed to operation 770.

Operation 770 can reset the file system flag to execute operations on the active file system and delete the clone shadow inode file. Following resetting the file system flag and deleting the clone shadow inode file, the method 700 can end in operation 780.

Figure 8:
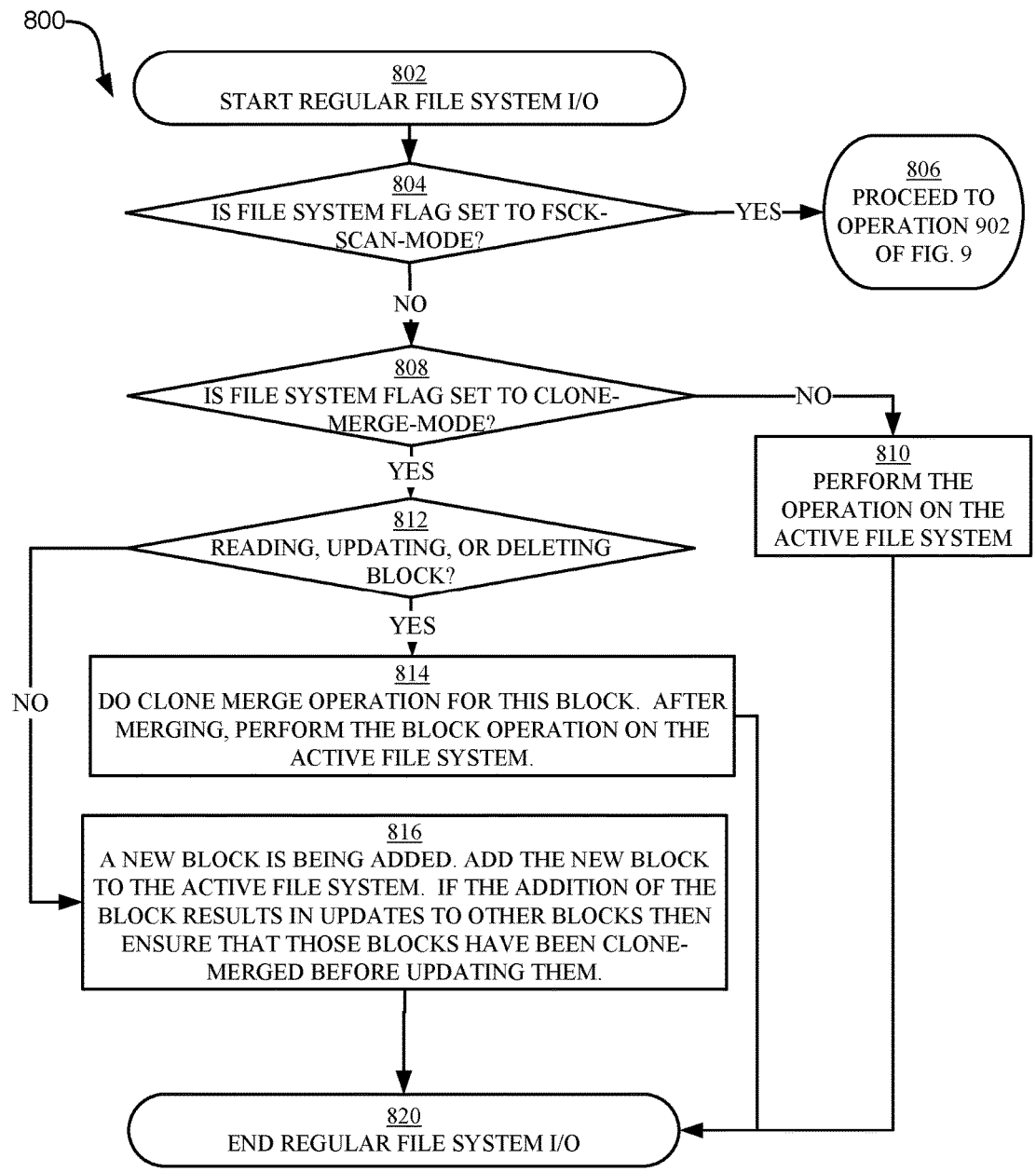
FIG. 8 illustrates a flowchart for an example method for conducting file system operations during file system clone-merge-mode according to some embodiments of the present disclosure.

Referring now to FIG. 8, illustrated is an example flowchart for a method for conducting file system operations during fsck scan and repair operations. In some embodiments, the method 800 can be executed by one or more processors (e.g., processors 205 of FIG. 2) according to a set of instructions (e.g., file system I/O instructions 266). The method 800 can begin at operation 802 and proceed to operation 804. Operation 804 can determine if the file system flag (e.g., file system flag 150 of FIG. 1) is set to fsck-scan-mode. If the file system flag is set to fsck-scan-mode, then the method 800 can proceed to operation 806 and continue to the method 900 as shown and described hereinafter with respect to FIG. 9. If the file system flag is not set to fsck-scan-mode, then the method 800 can proceed to operation 808.

Operation 808 can determine if the file system flag is set to clone-merge-mode. If the file system flag is not set to clone-merge-mode, then the method 800 can proceed to operation 810 and perform the operation on the active file system. After performing the operation on the active file system in operation 810, the method 800 can proceed to operation 820 and end.

Alternatively, if operation 808 determines the file system flag is set to clone-merge-mode, then the method 800 can proceed to operation 812. Operation 812 can determine if the operation comprises one of reading, updating, or deleting the block. If operation 812 determines that the operation does not comprise one of reading, updating, or deleting the block, then the method 800 can proceed to operation 816. Operation 816 can determine a new block is being added, and operation 816 can add the new block to the active file system. If the addition of the block results in updates to other blocks, then operation 816 can ensure that those blocks have been clone-merged before updating them. Following operation 816, the method 800 can proceed to operation 820 and end.

Alternatively, if operation 812 determines that the operation is one of reading, updating, or deleting a block, then the method 800 can proceed to operation 814. Operation 814 can do a clone merge operation for the respective block. After the merging of the respective clone block with the respective corresponding active file system block, the respective operation can be performed on the respective block in the active file system. Following operation 814, the method 800 can proceed to operation 820 and end.

Figure 9:
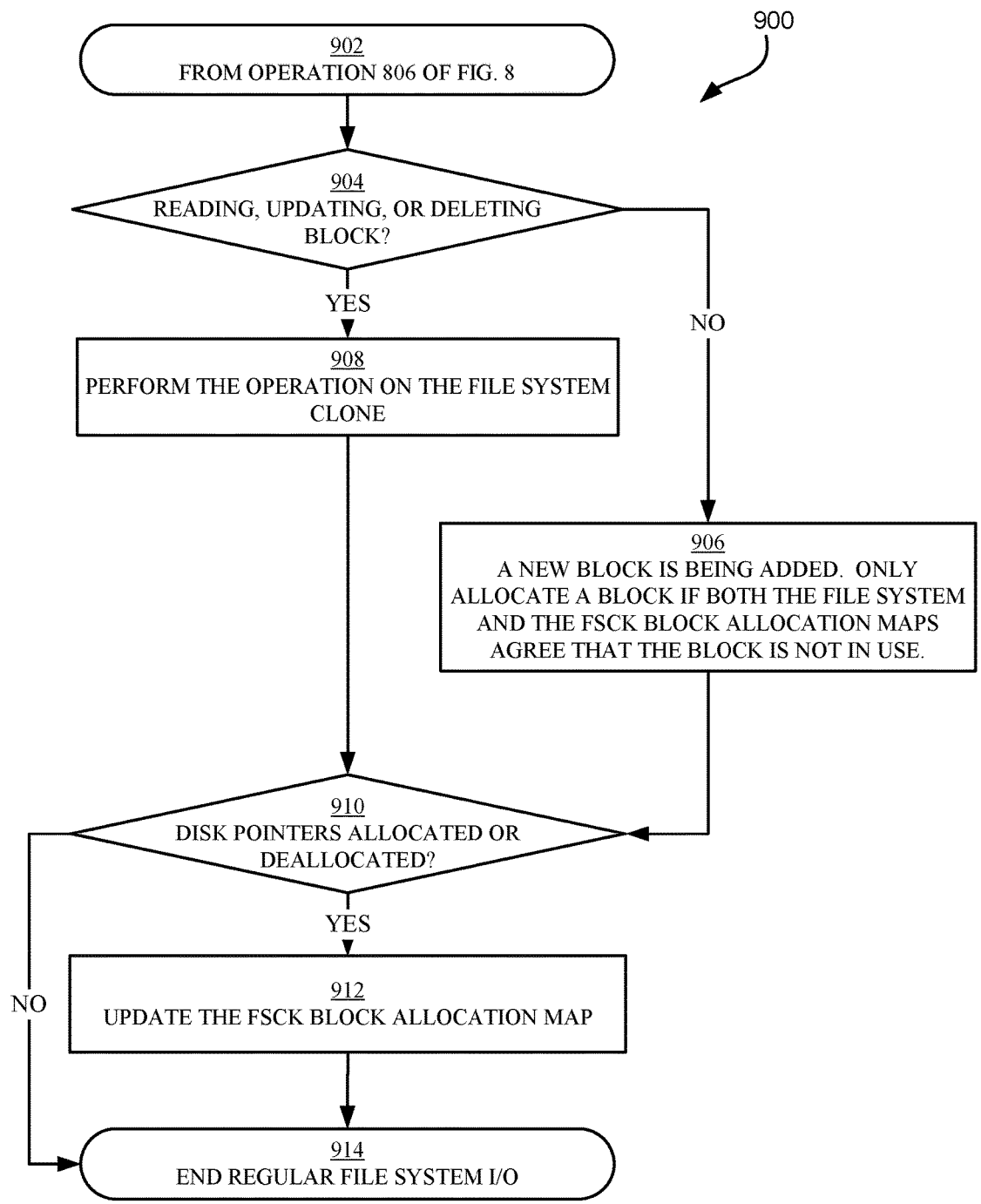
FIG. 9 illustrates a flowchart for an example method for conducting file system operations during fsck-scan-mode according to some embodiments of the present disclosure.

Referring now to FIG. 9, illustrated is an example flowchart for performing system operations during fsck operations. In some embodiments, the method 900 can be executed by one or more processors (e.g., processors 205 of FIG. 2) according to a set of instructions (e.g., file system I/O instructions 266 of FIG. 2).

The method 900 can begin at operation 902 based on determining the file system flag (e.g., file system flag 150 of FIG. 1) is set to fsck-scan-mode in operation 804 of FIG. 8. Operation 904 can determine if the operation is to read, update, or delete a respective block. If operation 904 determines the operation is not one of reading, updating, or deleting the block, then the method 900 can proceed to operation 906.

Operation 906 can determine a new block is being added and can allocate the block if both the active file system block allocation map and the fsck block allocation maps agree that the block is not in use. This agreement between the active file system block allocation map and the fsck block allocation map can ensure a new block allocation does not result in a cross-linked block since the active file system block allocation map may be corrupt. In the event the respective block has not been evaluated by fsck operations, a new block is allocated, and the new block is cross-linked, then fsck operations can be configured to delete all references to the cross-linked block in the active file system and its snapshots and thereby resolve the cross-linked status of the respective block. Since only the file system clone will update this block, there is no danger of block overwrites and/or corruption to the file system clone. Following operation 906, the method 900 can proceed to operation 910 as described in further detail hereinafter.

If operation 904 determines the operation is one of reading, updating, or deleting the block, then the method 900 can proceed to operation 908. In operation 908, the operation can be performed on the file system clone and the method 900 can proceed to operation 910.

Operation 910 can determine if the disk pointers for the respective block are allocated or deallocated. That is to say, operation 910 can determine if the read, update, delete, or add operation resulted in any changes to the disk pointers of a respective block (e.g., if they were added, removed, or otherwise changed). If any disk pointers were allocated or deallocated, the method 900 can proceed to operation 912 and update the fsck block allocation map with these modified disk pointers. Following operation 912, the method can end at operation 914. If operation 910 determines no disk pointers were allocated or deallocated, then the method 900 can proceed to operation 914 and end.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
   creating a file system clone replicating an active file system at a first time, a file system consistency check (fsck) block allocation map, a fsck cross-linked block allocation map, and a fsck inode allocation map, wherein creating a file system clone further comprises:
      quiescing the active file system;
      creating a clone inode file comprising a plurality of respective disk pointers pointing to a plurality of respective inodes in the active file system;
      transferring respective user operations associated with the active file system to the file system clone; and
      un-quiescing the active file system;
   checking the active file system for file system corruptions, wherein respective user operations associated with the active file system are executed on the file system clone concurrent with checking the active file system, wherein checking the active file system further comprises:
      setting, in the fsck inode allocation map, a first bit corresponding to a first inode in the active file system, wherein a first disk pointer of the first inode points to a first block in the active file system;
      determining that a second bit corresponding to the first block pointed to by the first disk pointer of the first inode is already set in the fsck block allocation map; and
      setting, in response to determining that the second bit is already set, a third bit corresponding to the first block in the fsck cross-linked block allocation map, wherein setting the third bit in the fsck cross-linked block allocation map indicates that the first block is directly referenced by at least two disk pointers causing a cross-linked block corruption; and
   merging, in response to resolving one or more file system corruptions, the file system clone with the active file system, wherein a respective user operation associated with a respective block of the active file system is executed on the active file system after merging a respective corresponding block of the file system clone with the respective block of the active file system.

2. The method of claim 1, wherein respective user operations comprise read, update, and delete operations.

3. The method of claim 1, wherein checking the active file system for file system corruptions further comprises:

deleting respective disk pointers associated with respective blocks having respective bits set in both the fsck cross-linked block allocation map and the fsck block allocation map; and resetting respective bits in the fsck block allocation map and the fsck cross-linked block allocation map corresponding to respective blocks pointed to by respective deleted disk pointers.

4. The method of claim 3, wherein checking the active file system further comprises:

determining one or more discrepancies between the fsck block allocation map and an active file system block allocation map; and resolving, based on the determining, the one or more discrepancies.

5. The method of claim 1, wherein merging the file system clone and the active file system further comprises:

identifying one or more allocated blocks in the file system clone;

copying respective allocated blocks in the file system clone into corresponding blocks of the active file system; and deleting respective allocated blocks in the file system clone after copying respective allocated blocks in the file system clone into corresponding blocks of the active file system.

6. A system comprising:

an interface of a computer monitor receiving user input regarding user operations associated with an active file system stored in a memory communicatively coupled to the computer monitor; and a processor communicatively coupled to the interface and executing a file system consistency check (fsck) utility communicatively coupled to the active file system and a file system flag managing user operations associated with the active file system, wherein the processor executes a method comprising:

generating a file system clone replicating the active file system at a first time, a fsck block allocation map, a fsck cross-linked block allocation map, and a fsck inode allocation map, wherein generating the file system clone further comprises:

quiescing the active file system;

creating a clone inode file comprising a plurality of respective disk pointers pointing to a plurality of respective inodes in the active file system;

transferring respective user operations associated with the active file system to the file system clone; and un-quiescing the active file system;

setting the file system flag to fsck-scan-mode responsive to generating the file system clone, wherein fsck-scan-mode directs respective user operations associated with the active file system to be executed on the file system clone;

resolving one or more file system corruptions in the active file system while the file system flag is set to fsck-scan-mode, wherein resolving file system corruptions further comprises:

setting, in the fsck inode allocation map, a first bit corresponding to a first inode in the active file system, wherein a first disk pointer of the first inode points to a first block in the active file system;

determining that a second bit corresponding to the first block pointed to by the first disk pointer of the first inode is already set in the fsck block allocation map; and setting, in response to determining that the second bit is already set, a third bit corresponding to the first block in the fsck cross-linked block allocation map, wherein setting the third bit in the fsck cross-linked block allocation map indicates that the first block is directly referenced by at least two disk pointers causing a cross-linked block corruption;

setting the file system flag to clone-merge-mode responsive to resolving one or more file system corruptions in the active file system, wherein clone-merge-mode directs respective user operations associated with a respective block of the active file system to be executed on the active file system after merging a respective block of the file system clone with the respective block of the active file system; and merge respective blocks of the file system clone with respective blocks of the active file system while the file system flag is set to clone-merge-mode.

7. The system of claim 6, wherein to resolve one or more file system corruptions on the active file system, the method further comprises:

deleting respective disk pointers associated with respective blocks that are set in the fsck cross-linked block allocation map and the fsck block allocation map; and resetting respective bits in the fsck block allocation map and the fsck cross-linked block allocation map corresponding to respective blocks pointed to by respective deleted disk pointers.

8. The system of claim 7, wherein to resolve one or more file system corruptions on the active file system the method further comprises:

comparing the fsck block allocation map to the active file system block allocation map;

determining, based on the comparing, one or more discrepancies between the fsck block allocation map and the active file system block allocation map; and resolving, based on the determining, the one or more discrepancies.

9. The system of claim 6, wherein to merge respective blocks of the file system clone with respective blocks of the active file system, the method further comprises:

identifying one or more allocated blocks in the file system clone;

copying respective allocated clone blocks into respective corresponding blocks of the active file system; and deleting the respective allocated clone blocks after copying the respective allocated clone blocks into the respective corresponding blocks of the active file system.

10. A computer program product comprising a computer readable storage medium having program instructions embodied therewith, wherein the computer readable storage medium is not a transitory signal per se, the program instructions executable by a processor to cause the processor to perform a method comprising:

creating a file system clone replicating an active file system at a first time, a file system consistency check (fsck) block allocation map, a fsck cross-linked block allocation map, and a fsck inode allocation map, wherein creating a file system clone further comprises:

quiescing the active file system;

creating a clone inode file comprising a plurality of respective disk pointers pointing to a plurality of respective inodes in the active file system;

transferring respective user operations associated with the active file system to the file system clone; and un-quiescing the active file system;

checking the active file system for file system corruptions, wherein respective user operations associated with the active file system are executed on the file system clone concurrent with checking the active file system, wherein checking the active file system further comprises:

setting, in the fsck inode allocation map, a first bit corresponding to a first inode in the active file system, wherein a first disk pointer of the first inode points to a first block in the active file system;

determining that a second bit corresponding to the first block pointed to by the first disk pointer of the first inode is already set in the fsck block allocation map; and setting, in response to determining that the second bit is already set, a third bit corresponding to the first block in the fsck cross-linked block allocation map, wherein setting the third bit in the fsck cross-linked block allocation map indicates that the first block is directly referenced by at least two disk pointers causing a cross-linked block corruption; and merging, in response to resolving one or more file system corruptions, the file system clone with the active file system, wherein a respective user operation associated with a respective block of the active file system is executed on the active file system after merging a respective corresponding block of the file system clone with the respective block of the active file system.

11. The computer program product of claim 10, wherein the program instructions further cause the processor to check the active file system for file system corruptions by:

deleting respective disk pointers associated with respective blocks that are set in both the fsck cross-linked block allocation map and the fsck block allocation map; and resetting respective bits in the fsck block allocation map and the fsck cross-linked block allocation map corresponding to respective blocks which were pointed to by respective deleted disk pointers.

12. The computer program product of claim 11, wherein the program instructions further cause the processor to check the active file system for file system corruptions by:

determining one or more discrepancies between the fsck block allocation map and the active file system block allocation map; and resolving, based on the determining, the one or more discrepancies.

13. The computer program product of claim 10, wherein the program instructions further cause the processor to merge the file system clone with the active file system by:

identifying one or more allocated blocks in the file system clone;

copying respective allocated blocks in the file system clone into corresponding blocks of the active file system; and deleting the respective allocated blocks in the file system clone after copying the respective allocated blocks in the file system clone into the corresponding blocks of the active file system.

14. The method of claim 1, wherein checking the active file system further comprises:

deleting the first disk pointer in response to setting the third bit;

identifying a second disk pointer referencing the first block in response to setting the third bit;

deleting the second disk pointer referencing the first block; and resetting the second bit in the fsck block allocation map and the third bit in the fsck cross-linked block allocation map in response to deleting the second disk pointer.

15. The system of claim 6, wherein checking the active file system further comprises:

deleting the first disk pointer in response to setting the third bit;

identifying a second disk pointer referencing the first block in response to setting the third bit;

deleting the second disk pointer referencing the first block; and resetting the second bit in the fsck block allocation map and the third bit in the fsck cross-linked block allocation map in response to deleting the second disk pointer.

16. The computer program product of claim 10, wherein checking the active file system further comprises:

deleting the first disk pointer in response to setting the third bit;

identifying a second disk pointer referencing the first block in response to setting the third bit;

deleting the second disk pointer referencing the first block; and resetting the second bit in the fsck block allocation map and the third bit in the fsck cross-linked block allocation map in response to deleting the second disk pointer.

* * * * *